Patented Oct. 20, 1936

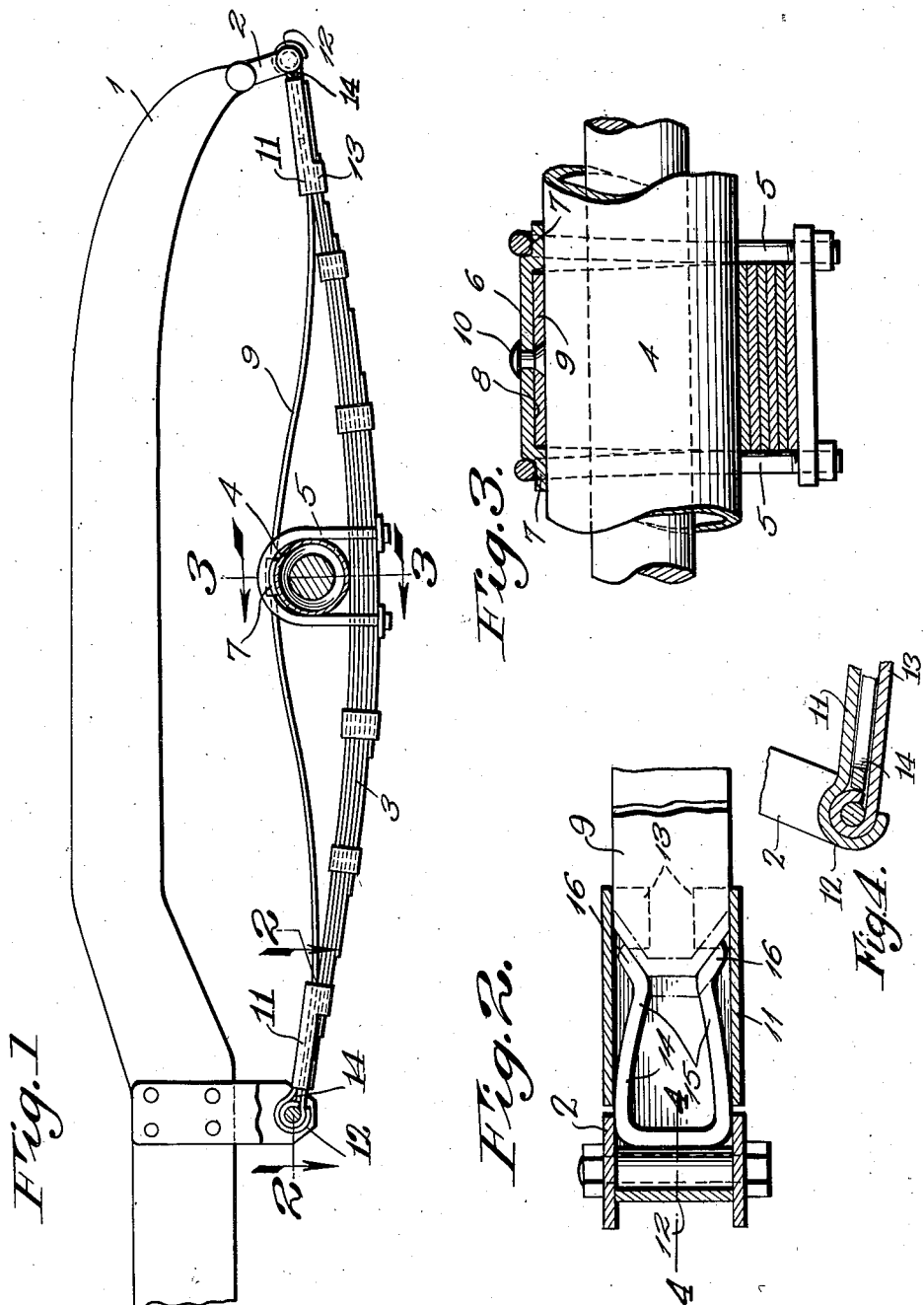

2,058,281

UNITED STATES PATENT OFFICE 2,058,281

ANTIREBOUND SPRING CONSTRUCTION

James J. Wesley, Phoenix, Ariz.

Application September 30, 1935, Serial No. 42,965

2 Claims. (Cl. 267—45)

This invention relates to an anti-rebound spring construction especially adapted for motor vehicles, and has for the primary object the provision of a device of this character which will efficiently check the rebound of a vehicle spring and aid the latter in maintaining the vehicle body level when traveling on a curve and which will eliminate the use of shock absorbers and similar devices and which may be readily adapted to a vehicle spring of a conventional semi-elliptical construction.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary sectional view showing a vehicle spring and axle of a vehicle equipped with my invention.

Figure 2 is a sectional view taken on the line 2—2 of Figure 1.

Figure 3 is a sectional view taken on the line 3—3 of Figure 1.

Figure 4 is a detail sectional view taken on the line 4—4 of Figure 2.

Referring in detail to the drawing, the numeral 1 indicates a fragmentary portion of a motor vehicle chassis having connected thereto by shackles 2, the ends of a spring 3, the latter being mounted to the motor vehicle axle, as shown at 4. The mounting is in the form of a hanger 5 which secures in place my invention which consists of a plate 6 having its ends offset forming seats 7 for the hanger 5 and a chamber 8 in one face of the plate. The chamber provides a seat for a spring member 9, the latter being secured to the plate, as shown at 10. The spring member is bowed with its ends bearing against the vehicle spring 3 adjacent the ends of the latter. Clips 11 are adapted to the end portions of the vehicle spring 3 and are provided with anchoring elements 12 that engage with the shackles 2 cooperating with ears 13 in securing the clips in position on the vehicle spring 3. The clips slidably receive the ends of the spring member 9 and have located therein spring elements 14 engageable with the ends of the spring member 9 to resist the movement of the ends of the spring member 9 in one direction relative to the vehicle spring 3. Each spring member 14 consists of integrally connected spring arms 15 having flared ends 16 which form seats engageable with the end of the spring member 9.

In operation, the vehicle spring 3 when subjected to a road shock elongates and after the force of the shock is exhausted the spring 3 reacts or returns to its initial position with considerable force, subjecting the vehicle to what is known as spring rebound. When the spring 3 returns to its normal position after being elongated in many instances the ends thereof move beyond the normal position of the spring and this movement is checked by the spring member 9 acting in connection with the spring members 15, thereby checking the spring rebound to the vehicle. The member 9 bears with considerable force on the vehicle spring 3 under normal conditions and thereby aids in maintaining the vehicle body level.

Having described the invention, I claim:

1. In combination with a segmental spring secured to a motor vehicle axle and to a motor vehicle chassis by shackles, a spring member secured to the axle and bearing against the segmental spring adjacent the ends thereof for checking the rebound action of the segmental spring, clips secured to the segmental spring and slidably receiving the ends of the spring member, and spring means in said clips to oppose the sliding movement of the ends of the spring member during stress on the latter.

2. In combination with a segmental spring secured to a motor vehicle axle and to a motor vehicle chassis by shackles, a spring member secured to the axle and bearing against the segmental spring adjacent the ends thereof for checking the rebound action of the segmental spring, clips secured to the segmental spring and slidably receiving the ends of the spring member, spring members located in the clips and each including spring arms having flared ends contacting the ends of the first-named member.

JAMES J. WESLEY.